Figure 1:
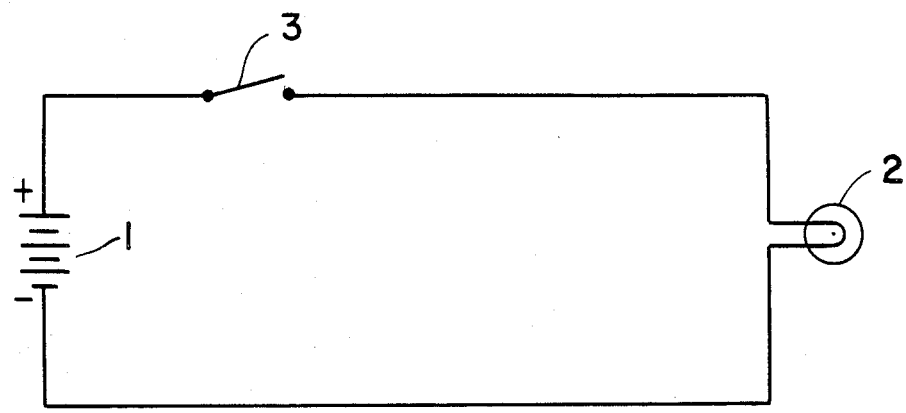

United States Patent [19]

Brassington

[11] Patent Number: 4,648,005
[45] Date of Patent: Mar. 3, 1987

[54] VEHICULAR HEADLIGHT/RUNNING LIGHTS SAFETY FLASHER DEVICE

[76] Inventor: Stanley J. Brassington, R.D. #2, Box 188, Ashland, Pa. 17921

[21] Appl. No.: 721,274

[22] Filed: Apr. 8, 1985

Related U.S. Application Data

[63] Continuation of Ser. No. 471,483, Mar. 2, 1983.

[51] Int. Cl.[4] .................. H01H 47/00; B60Q 1/02
[52] U.S. Cl. .................. 361/179; 307/10 LS; 315/82; 340/76
[58] Field of Search ............. 307/10 LS; 315/81, 82, 315/83; 200/61, 57, 81 H; 340/76, 81 R; 361/179

[56] References Cited

U.S. PATENT DOCUMENTS

| | | | |
|---|---|---|---|
| 2,932,814 | 4/1960 | Wilfert | 340/76 |
| 3,305,695 | 2/1967 | Late | 340/76 X |
| 3,559,206 | 1/1971 | Beecham | 200/61.57 X |
| 3,648,101 | 3/1972 | Suzuki | 315/82 |
| 4,425,560 | 1/1984 | Jones | 200/61.57 X |

*Primary Examiner*—L. T. Hix
*Assistant Examiner*—David M. Gray

[57] ABSTRACT

A device for interrupting electrical current flow in an automotive lighting system, whereby a squeezing action of an operating means having a fluid or gas contained in a sealed structure mounted on the circumference of the rim of a steering wheel, produces pressure differentials therein, which are converted into flashing signals emanating from the automotive lighting system, thereby eliminating the hazard occasioned by vehicle operator having to remove a hand from the steering wheel and eyes from the road in order to effectuate a flasher signal to nearby drivers, therewhile allowing a vehicle operator to effect the same from any point on the circumference of the rim thereof, by the squeezing action.

9 Claims, 2 Drawing Figures

VEHICULAR HEADLIGHT/RUNNING LIGHTS SAFETY FLASHER DEVICE

This is a Continuation Application of Applicaton Ser. No. 471,483, filed on Mar. 2, 1983.

BACKGROUND OF THE INVENTION

1. Field of Invention

The present invention relates to safety flasher devices in automotive lighting systems, and more particularly to safe mechanisms for interrupting primary electrical currents in the same.

2. Setting for the Invention

Modern vehicles including tractor-trailer trucks, presently require the standard installation of an ON/-OFF contact or like switch with electrical circuitry, so to activate the vehicle's factory installed headlamps and running lights. The driver wising to switch on the headlamps or running lights will reach to the vehicle's dash or instrument panel and manually activate the corresponding switch, or switches.

To switch off the lights, the reverse operation would be achieved by reaching to the dash or instrument panel to flash the headlamps and running lights. This can pose great highway safety problems to other drivers, for the reason that the driver must control carriage weights in excess of 90,000 pounds along with tractor and trailers of lengths in excess of sixty feet, while reaching to the dash or instrument panel to switch the lights momentarily ON and then OFF. In connection therewith, the length of the tractor-trailer is an important factor when considering to pass another vehicle. Thus, when one truck is passing another, the yield in vehicle speed, necessary to drop back into the slow lane after the pass is complete, is signaled upon his flashing of the head lights to other drivers, in hope that they will allow time and space for the forward truck's safe return to the inner lane of traffic.

Signaling by use of headlamp and running lights, continues to be a chief mode of communications among truck drivers. Reaching to switch the lights on and off while driving and passing is a very dangerous practice, especially in the case of tractor-trailer trucks, and hitherto, prior art has not provided a safe and simple way to solve this serious highway hazard.

Hitherto, prior art has not directly addressed the problem created by a vehicle driver reaching to the dash or instrument panel to effect a flashing signal by turning his vehicle's headlamp and/or running lights off, and then on, in a repeated fashion. In this connection, what has been taught as a partial solution thereto, has depended upon several factors, including whether a vehicle is being engineered with the abovementioned problem in mind, or whether one is confronted with a preexisting vehicle that has no specialized apparatus with which to generate a flashing signal and the like, in a safe manner, from where the vehicle operator sits behind the steering wheel.

Some vehicle manufacturers incorporate headlamp control arrangements to enable intermittent operation of headlamp assembly, when headlamps, having two lamps (for levels of illumination), are utilized as a flashing signal system operable both day and night times. Such prior art teaches ways to alternately deliver electric power to a main headlamp or set thereof, to a subordinate headlamp of set thereof, in a cyclical manner, once the vehicle operator sets a switch mounted within his reach, to its ON position. Such prior art teaches a way to effectuate a switching function that alternately delivers electric power to one headlamp assembly on a vehicle, and then to another headlamp assembly in a cyclic manner. Such a signaling system presumes that existence of two or more headlamp assemblies on a vehicle, does not effectuate the flashing of running lights on a tractor-trailer, and also it requires factory installation. Moreover, it is directed towards application in automobiles, and not tractor trailer trucks, as is the present invention.

Other approaches to signal generation, for passing and other driving operations, have been less sophisticated and teach simply to add ON/OFF type switches to standard equipment, so to provide a more convenient way to signal, via a headlamp or running light system, rather than by manually switching multiposition switches. This latter approach does not, however, remove the hazard occasioned by a driver's removal of hand off steering wheel and reaching for the dash or instrument panel to effect a flashing of headlamps and running lights, when signaling to drivers in the slow lane behind him, and also to drivers attempting to pull into the right lane after effecting a passing maneuver, that he would like to pull his vehicle back into the slow lane. In short, while signal passing systems are factory available on many automotive vehicles, they do not allow the driver to effectuate a flashing of headlamps and running lights without requiring the driver to remove a hand from the steering wheel. In connection therewith, there is prior art which teaches a practice of mounting on the rim of a steering wheel, in a plane perpendicular thereto, a steering wheel knob with which to perform the switching of electrical currents therein with ones fingers. This device has serious short comings however, since such a steering wheel knob, functioning as an operating means, creates a safety problem to vehicle operators in the case of a sudden or emergency stops, or accidents, whereby operator's chest and torso may be easily thrown thereagainst and resultingly punctured thereby. Further, prior art, hitherto, has not taught a safe way to provide an automotive lighting system with an operating means that can be factory installed by automotive vehicle manufaturer or added on as an accessory, and which is operable from any point on the steering wheel, without requiring the vehicle driver to remove his hand therefrom, and thereby eliminating the hazard associated therewith.

OBJECTS AND SUMMARY OF THE INVENTION

An object of the present invention is to provide a safe way to practice night-time headlamp and running light communications between vehicle drivers, most particularly tractor-trailer truck drivers.

It is a further object of the present invention to provide a safe way for vehicle drivers to continuously have both hands on the steering wheel and both eyes on the road while simultaneously being able to communicate with other drivers via flashing their headlamps and running lights, while in an 'ON' position, to effect intermittant lumination. Another object of the invention is to achieve the same by using a sufficiently ampere-rated two pole electrical relay, in order to handle the total maximum electrical current required by a headlamp and running light system of a tractor-trailer truck. This object is achieved by configuring the relay so that it is triggered by a pressure sensor switch that is responsive to changes occasioned in the pressure of a fluid that is contained in a closed section of tubing or functionally like structure attached to the inside circumference of the steering wheel rim of the vehicle, where the changes in pressure of the fluid are caused by the driver compressing or squeezing the tubing attached thereto, without removing a hand therefrom, and achieving the same from any point on the rim thereof.

A still further object of the present invention is to provide electrical circuitry that incorporates a safety feature whereby, whenever the invention may fail or be rendered inoperative, the vehicle's lights remain ON.

An even further objective of the present invention is to provide a Safety Flasher Device having an operating means which simply solves the safety hazard created when using a steering wheel knob or like devices to switch electrical current thereon, which knob or device may easily puncture the chest or torso of a vehicle operator in the event of sudden or emergency stops or accidents. An even further object of the present invention is to provide a device for effecting a flashing signal from a vehicle's headlamp and running lights, that can be user-installed in factory installed automotive lighting systems, where the device employs a relay that is coupled with a pressure sensor switch, so that pressure changes, occasioned in a fluid containing structure attached to the circumference of a steering wheel, are sensed by the pressure sensor switch, which in turn activates the relay in order to interrupt the existing closed headlamp and running light circuit, thereby momentarily switching off power to the automotive lighting system. Preferably, this unit would feature its own ON/OFF switch thereby allowing the vehicle's driver to switch off the unit, in a manner that would have no effect upon the headlamp and running lights of the system, since the unit functions independently from the factory installed automotive ligting system of the vehicle, to which a unit may be user installed simply and quickly.

The present invention provides drivers of vehicles with a safer approach to flashing automotive headlamps and running lights as a means of highway communication, than does the current practice of removing one hand from the steering wheel while the vehicle is in motion, in order to manually engage and disengage dash or instrument panel mounted switches. While needing to signal to other drivers on the highway, it is not unlikely that the vehicle operator will need to shift gears by use of a stickshift. Moreover, then, the present invention when applied to tractor-trailer or other vehicles, provides a simple, yet highly effective solution to vehicle signaling hazards that are frequently encountered during highway driving when removing a hand from the steering wheel, in order to manually effect a flashing of headlamp and running lights via dash or instrument panel mounted switches.

The foregoing and further objects are addressed hereinafter. The above objects are attained, generally, by a power switch means for interrupting electric current flow from an electric power source in an automotive light system, whereby a power switch means that comprises, a normally closed relay switch connected between a main lighting switch and a head lamp assembly, a relay coil controlling a relay switch, a power switch, a pressure sensor switch of which a relay coil, being connected in series between a main lighting switch and a vehicle's power source whereby, the relay switch when used in combination with the power source means and a structure containing a gaseous fluid, liquefied fluid, or gelatinous substance which is attached to the circumference of a steering wheel of a vehicle in which the automotive lighting system; a pressure sensor switch operable to open and close in response to pressure changes occasioned in the fluid containing structure; and a relay switch that is operable to open and close in response to the opening and closing of the pressure sensor switch, where the opening and closing of the relay switch causes a corresponding interruption in the electric current flow to headlamp and running lights on the vehicle while in the switched ON position, thereby producing a flashing signal from an energized state and an interruption of electric current.

Figure 2:
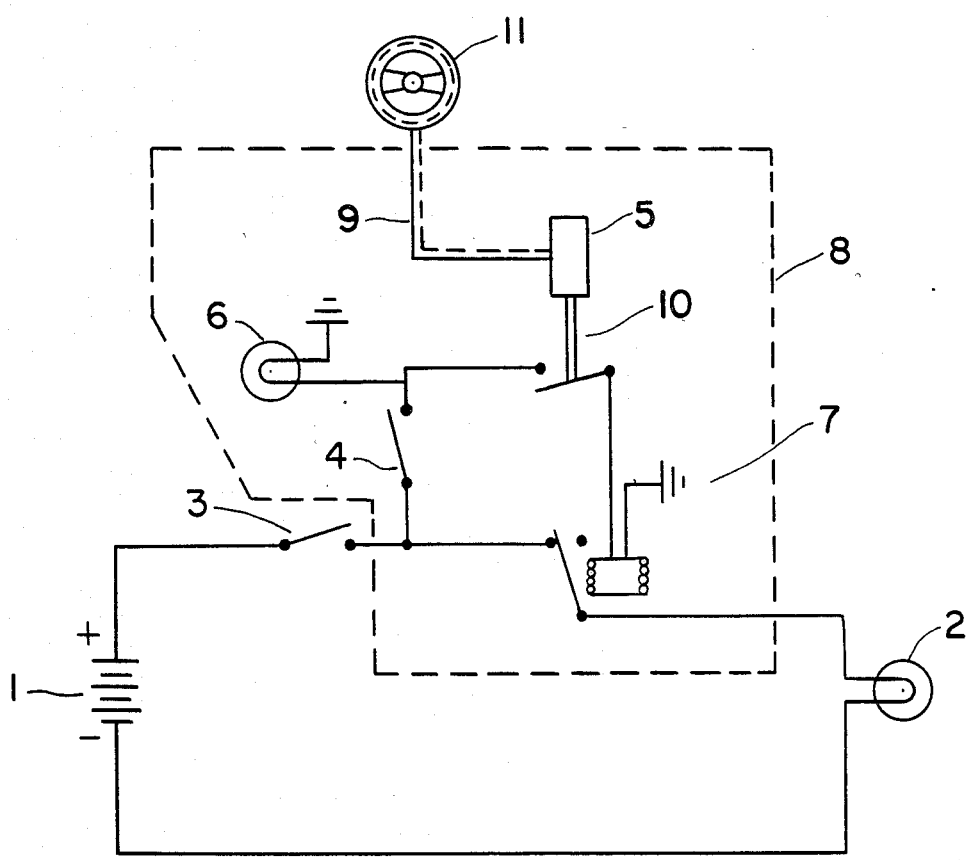

The invention is hereinafter described with reference to the accompanying drawings in which:

FIG. 1 is a schematic diagram of circuitry underlying an automotive lighting system, showing a head lamp assembly, a headlamp switch, and an electric power source connected in a series configuration; and FIG. 2 is a schematic diagram of the circuitry shown in FIG. 1, wherein a device for interrupting electrical current is shown configured in series between the headlamp assembly and the head lamp switch thereof.

PREFERRED EMBODIMENT OF INVENTION

Referring to FIG. 1, an electrical power source 1, a factory installed headlamp assembly 2, and an original equipment manufacture's headlamp switch 3, are connected in series configuration. The schematic diagram of FIG. 1, provides a circuit representation of an automotive lighting system, and is adequate for purposes of defining the present invention. In order to switch on the headlamp assembly 2, the vehicle operator typically would remove one of two hands from the steering wheel, and removing his eyes from the road, identifies headlamp switch 3 and, thereafter reaches for the dash or instrumental panel to which the headlamp switch 3 is mounted, and then engages it into its ON position.

Turning to FIG. 2, the present invention is featured as a flasher device contained within boundaries identified by 8; however, the invention is more properly conceived as a flasher device 8, hereinafter device 8; that is inserted in series with headlamp switch 3 and headlamp assembly 2 of FIG. 1 and FIG. 2.

As shown in FIG. 2, device 8 consists of a pressure sensitive switching mechanism 5; a power switch 4; an electrical relay 7, and an indicator light 6, all of which are connected in a series configuration with respect to each other, where the device 8 is configured in series with headlamp switch 3 and headlamp assembly 2. The pressure sensitive switching mechanism 5 of FIG. 2, would actually have two subcomponents, i.e. a structure 9 of FIG. 2 containing a fluid or a gelatinous substance and a pressure sensor switch 10 of FIG. 2, (e.g. Fairchild Model # PSF100A or like type), the latter of which is responsive to pressure differences of 0.02 PSI or ½ inch of water column through a 3/16th inch porthole, occasioned in the fluid that is contained in a sealed tubing structure 9 of FIG. 2 which would be attached to the circumference of the steering wheel 11 of FIG. 2 of a vehicle.

Referring to FIG. 2., the operation of the device 8 is as follows: The device 8 is inserted in series with the headlamp and running lights switch 3 and headlamp and running lights assembly 2 of an automotive vehicle, e.g. tractor-trailer truck; and the fluid containing structure 9, preferably neoprene tubing, attached to the underside circumference of a steering wheel 11, would be connected to the pressure sensor switch 10 having a 10 milliampere current rating. A vehicle operator, driving at night, would switch On the headlamp and running lights Switch 3 of the automotive lighting system, in order to energize the headlamp and running lights thereof. And when desiring to utilize the signal flasher device 8, the operator would close the power switch 4 of the signal flasher device 8 within the automotive lighting system. And when desiring to flash the headlamp and running lights of the vehicle, the operator would, without removing a hand from the steering wheel 11, or shifting eyes away from the road, squeeze, anywhere along the circumference of the steering wheel 11, an operating means that comprises a structure 9 containing a fluid or gelatinous substance, such as tubing filled with air which is attached to the circumference of the steering wheel 11. This squeezing action by operator's hand placed anywhere thereon, causes a sufficient pressure differential in the fluid containing a structure 9 (e.g. tubing or functionally like structure), in order to operate the signal flasher device. Such generated pressure differentials causes the pressure sensor switch 10 (e.g. Fairchild, Model #PSF100A or like type) of the sensitive switching mechanism 5 of FIG. 2, to close which thereby causes the relay 7 to be energized, which opens at Relay 7, circuit of FIG. 2 in which the electric power source 1 and headlamp and running lights assembly 2 are in series configuration; thereby causing a momentary interruption of electrical current in the circuit of FIG. 2, thereby effectuating a flashing signal. Similarly, repeated squeezing action of the operating means having a fluid containing structure 9 mounted on the steering wheel 11, causes a repeated flashing action of lights from the energized to the deenergized state in response to the generated pressure differentials in the fluid containing structure 9.

Although there are many embodiments in which the underlying principles of the present invention may operate, the inventor has discovered that the relay 7 may be best realized as an environmentally sealed, two-pole single-throw, direct-current relay, capable of handling 25 amperes across headlamp switch 3 in a 6, 12, or 24 volt automotive system. Moreover, the pressure sensitive switching mechanism 5, may be realized by combining a pressure sensor switch 10 (e.g. Fairchild Model # PSF100A or similar type) with neoprene tubing having a diameter of ⅛ of an inch, where such pressure sensor or like type switch is normally open and is of a double break type with positive and negative leads. This combination is to be then connected in series with the relay 7 that is connected to the original equipment manufactures headlamp and running light assembly 2 as shown in FIG. 2. When activated device 8 will interrupt the existing electrical current delivered to headlamp and running light assembly 2 switching off the headlamp and running lights 2 to effectuate a flashing action therefrom.

These and still further modifications of the present invention will occur to persons skilled in the art, and such modifications are deemed to be within the scope and spirit of the invention as defined by the appended claims.

What is claimed is:

1. In an automotive lighting system, a device for interrupting electrical power source in said lighting system, said device comprising:

an operating means having a structure containing a fluid, said structure being attached to the circumference of a steering wheel of a vehicle wherein said automotive lighting system is installed;

a pressure sensor switch connected to said structure and responsive to pressure changes occasioned therein, said pressure sensor switch closing in response to pressure applied to said structure; and a power switch means that comprises, a normally closed relay switch connected between a main lighting switch and a head lamp assembly, a relay coil controlling said relay switch, said power switch, said pressure sensor switch, and said relay coil being connected in series between said main lighting switch and said power source whereby, said relay switch is operable to open and close in response to opening and closing of said pressure sensor switch, said opening and closing thereof effectuating a flasher signal from said automotive lighting system.

2. A device as claimed in claim 1, wherein said structure is made of flexible tubing, preferably of neoprene, that reversibly deforms under compressional forces, and said guid contained therein is air.

3. A device as claimed in claim 1, wherein said structure containing fluid is made of flexible tubing, preferably of neoprene, that reversibly deforms under compressional forces, and said fluid contained therein is a gelatinous substance.

4. A device as claimed in claim 1 wherein, said power switch means is adapted to be installed on the vehicle after manufacture, or factory equipped at time of manufacture in the vehicle's automotive lighting system.

5. In an automotive lighting system, a device for interrupting electrical current flow from an electrical power source in said automotive lighting system, said device comprising:

an operating means having a structure containing a gas, said structure being attached to the circumference of a steering wheel of a vehicle wherein said automotive lighting system is installed;

a pressure sensor switch responsive to pressure changes occasioned in said structure, said pressure sensor switch closing in response to pressure applied to said structure; and a power switch means that comprises;

a normally closed relay switch connected between a main lighting switch and a head lamp assembly, a relay coil controlling said relay switch, said power switch, said pressure sensor switch, and said relay coil being connected in series between said main lighting switch and said power source whereby, said relay switch, when used in combination with a power switch means and a structure containing a fluid, is operable to open and close, in response to opening and closing of the pressure sensor switch, said opening and closing thereof effectuating a flasher signal from said automotive lighting system.

6. A device as claimed in claim 1 where, in said structure containing a fluid, said fluid is a gas.

7. A device as claimed in claim 1 where, in said structure containing a fluid, said fluid is a liquid.

8. A device claimed in claim 1 where, in said structure containing a fluid, said fluid is gelatinous.

9. A device as claimed in claim 5 wherein, said power switch means in combination with a structure containing a fluid, said structure attached to the circumference of a steering wheel is adapted to be installed on the vehicle after manufacture, or factory equipped at the time of manufacture in the vehicle's automotive lighting system.

* * * * *